No. 742,836. PATENTED NOV. 3, 1903.
F. M. CARROLL.
ANTIFRICTION BEARING.
APPLICATION FILED NOV. 19, 1902.
NO MODEL.

WITNESSES:
Geo. V. Rasmussen
Rob't S. Allyn

INVENTOR
Fred M. Carroll
BY
R. Cuuulue,
ATTORNEY

THE NORRIS PETERS CO., PHOTO-LITHO., WASHINGTON, D. C.

No. 742,836.

Patented November 3, 1903.

UNITED STATES PATENT OFFICE.

FRED M. CARROLL, OF NEW HAVEN, CONNECTICUT, ASSIGNOR TO EDWARD S. SWIFT, TRUSTEE, OF NEW HAVEN, CONNECTICUT.

ANTIFRICTION-BEARING.

SPECIFICATION forming part of Letters Patent No. 742,836, dated November 3, 1903.

Application filed November 19, 1902. Serial No. 131,929. (No model.)

*To all whom it may concern:*

Be it known that I, FRED M. CARROLL, a citizen of the United States, residing at New Haven, in the county of New Haven, State of Connecticut, have invented certain new and useful Improvements in Antifriction-Bearings, of which the following is a full, clear, and exact description.

This invention relates to antifriction-bearings.

The main object of this invention is to produce a highly efficient and durable antifriction-bearing which while generally useful as a bearing for pulleys, shafts, and the like has particular utility when employed in connection with trolley-wheels.

Figure 1:
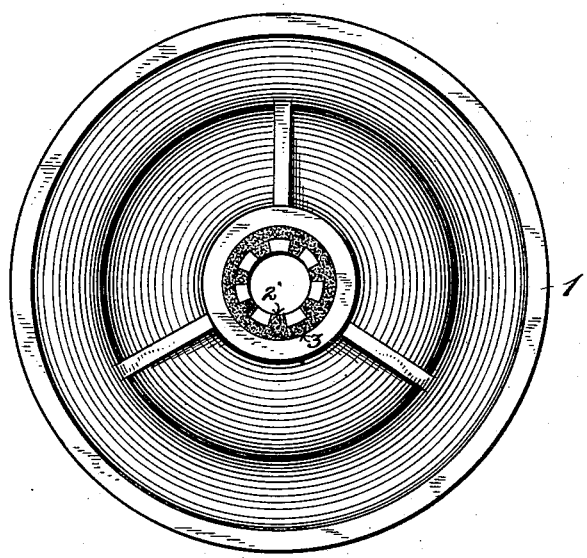
Figure 2:
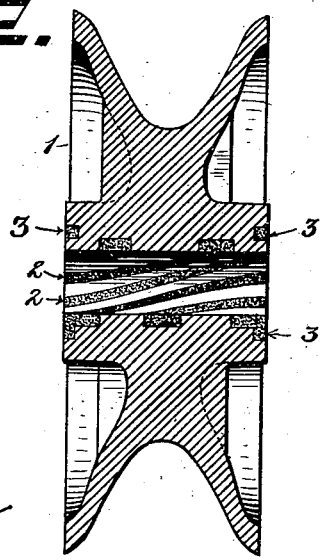

In the accompanying drawings, Figure 1 is a side elevation of a trolley-wheel embodying my improved antifriction-bearing. Fig. 2 is a vertical cross-section of Fig. 1.

For illustrative purposes I have shown my invention embodied in a form of a trolley-wheel. In this form the bore of the hub is provided with rifled grooves—that is, grooves extending from one end to the other with only a partial turn. These grooves are preferably undercut. The flanges of metal which separate said grooves bear upon the axle, (not shown,) and the grooves are filled with suitable lubricating material—for example, graphite. In addition to the grooves extending longitudinally through the bore of the hub annular grooves are preferably formed in each end of the hub and concentric with the bore. (See Fig. 1.) These annular grooves are preferably so positioned that they intersect the grooves through the bore. Hence the lubricating material introduced into the spiral grooves makes a continuous connection with the lubricating material in the annular grooves at the ends of the hub. The metal flanges between the grooves are backed directly by the metal of the hub, and hence in use the pulley will withstand severe strains. The presence of the graphite provides lubrication between the pulley and the shaft and between the pulley and the bearings at the ends of the hub.

In the drawings, 1 is the trolley-wheel.

2 is the lubricating material filling the rifled grooves extending through the bore of the hub.

3 is the lubricating material filling the annular grooves at the ends of the hub.

By undercutting the grooves extending through the bore and giving a long rifled pitch to the same it has been found that the lubricating material is most effectively retained.

A pulley hub or bushing constructed in accordance with my invention will be found to retain the lubricating material effectively, because the material in the rifled grooves is continuous with the lubricating material in the annular grooves. The effect of this continuity is that the ring-like mass of lubricating material serves to anchor the ends of the lubricating material contained in the rifled grooves, thus tending to prevent the same from peeling up or from being broken away.

What I claim is—

A pulley provided with a hub having an annular groove at each end and a central bore, the latter having rifled grooves therein, the rifled grooves intersecting said annular grooves, and a filling of lubricating material in the rifled grooves and also in the annular grooves, substantially as described.

Signed at New Haven, Connecticut, this 17th day of November, 1902.

FRED M. CARROLL.

Witnesses:
MAX C. LANGE,
E. E. GREGORY.